United States Patent Office 3,037,961
Patented June 5, 1962

3,037,961
PREVENTION OF ODOR FORMATION IN STABILIZATION OF POLYVINYL CHLORIDE RESINS
William E. Leistner and Olga H. Knoepke, Brooklyn, N.Y., assignors to Argus Chemical Corporation, Brooklyn, N.Y.
No Drawing. Filed Aug. 11, 1959, Ser. No. 832,902
5 Claims. (Cl. 260—45.75)

It is well known that organotin oxides and organotin halides react with mercaptans to form organotin mercapto compounds in which part of the four tin valencies is linked directly to sulfur. These compounds are excellent stabilizers for polyvinyl chloride resins.

Such compounds are for instance organotin mercaptides of the general formula $(RS)_x Sn.R'_{4-x}$, wherein R and R' are hydrocarbon radicals, e.g. alkyl such as methyl, ethyl, butyl, octyl, dodecyl, and octadecyl; aryls, such as phenyl, tolyl, xylyl, oxyalkyl and oxyaryl; and the furfuryl and tetrahydrofurfuryl groups; $x$ is an integral number between 1 and 4. The following tin mercaptides are listed by way of example:

Tin tera-dodecylmercaptide
$$Sn(S.C_{12}H_{25})_4$$
Tin tetra-phenylmercaptide
$$Sn(S.C_6H_5)_4$$
Tin dibutyl di-dodecylmercaptide
$$(C_4H_9)_2Sn(S.C_{12}H_{25})_2$$
Tin dibutoxy di-octylmercaptide
$$(C_4H_9O)_2Sn(S.C_8H_{17})_2$$
Tin dibutoxy di-phenylmercaptide
$$(C_4H_9O)_2Sn(S.C_6H_5)_2$$
Tin diphenoxy di-butylmercaptide
$$(C_6H_5O)_2Sn(S.C_4H_9)_2$$
Tin diphenoxy di-phenylmercaptide
$$(C_6H_5O)_2Sn(S.C_6H_5)_2$$

Another group of organotin stabilizer compounds are represented by the general formula $R_n$—Sn—$X_{4-n}$, wherein R again stands for a radical as listed above, while X stands for an ester of a monobasic mercapto acid having from 2 to 6 carbon atoms, with a monohydric alcohol, and $n$ represents an integral number from 1–3. In all the compounds, the sulfur atom is directly linked to tin. As acids, the following may be used; thioglycolic, thiopropionic, thiobutyric, thiovaleric or thiocapronic; as alcohols, n-butyl, sec. butyl, tert. butyl, hexyl, octyl, dodecyl, cetyl alcohols, butylcarbitol, benzyl, cyclohexyl, methyl cyclohexyl, tetrahydrofurfuryl and tetrahydroabietyl alcohols.

Specific examples of such esters are: dibutyltin dithioglycolic acid cyclohexyl ester $$(C_4H_9)_2—Sn—(SCH_2COOC_6H_{11})_2$$

dibutyltin dithioglycolic acid tetrahydroabietyl ester, $$(C_4H_9)—Sn—(SCH_2—COOC_{20}H_{30})_2$$

monobutyltin tri-β-thiopropionic acid hexyl ester $$C_4H_9.Sn—(S.(CH_2)_2COOC_6H_{13})_3$$

dilauryltin dithiobutyric acid butyl ester, $$(C_{12}H_{25})_2.Sn.(S.CH_2CH_2CH_2COOC_4H_9)_2$$

and triphenyltin thioglycolic acid benzyl ester $$(C_6H_5)_3.Sn—SCH_2COOCH_2C_6H_5$$

Instead of the mercapto acid esters listed above, mercapto acid amides have been described and used; esters of monovalent mercapto alcohols with monocarboxylic acids; esters of glycols with mercaptocarboxylic acids.

Finally, another group of compounds known as stabilizers are organotin xanthates of the general formula $$R_x—Sn—(S.\overset{S}{\overset{\|}{C}}.O.R')_{n-x}$$

where R stands for an alkyl, aryl, hydroaromatic or heterocyclic radical and $$S.\overset{S}{\overset{\|}{C}}.OR'$$

for an anion of an alkyl xanthic acid, and $n$ for an integer from 1 to 3.

These compounds have, however, one drawback that is formation of odor in processing and still more serious, sometimes a mercaptan odor in the finished products.

It is the object of this invention to prevent this formation of odor.

The odor problem can be solved by adding in processing a peroxide compound which may be inorganic or organic. Examples of inorganic peroxides are sodium perborate, potassium persulfate and sodium percarbonate. Examples of organic peroxides are dicumyl peroxide, tertiary butylhydroperoxide, and benzoyl peroxide.

In general, the amount of the peroxide compound added will range from 0.05 to 0.5% calculated on the weight of the resin.

The invention will now be more fully explained with reference to a number of specific examples, but it should be understood that these are given by way of illustration and not of limitation and that many changes in the details can be made without departing from the spirit of the invention. In the following all parts are given by weight.

Example 1

100 parts Geon 101 EP (a polyvinyl chloride homopolymer) are mixed in a pan with 50 pts. dioctylphthalate, 0.75 pt. A-C polyethylene 8416 (a low-molecular weight polyethylene used as lubricant) 3 pts. dibutyltin bis (octyl thioglycolate) and 0.25 sodium perborate.

The mixture is fused on a heated two-roll mill at 320° F. until a homogeneous sheet is obtained which takes about 5 minutes. Neither in processing nor in the finished sheet is any mercaptan odor apparent. A similar composition prepared without using sodium perborate gave off a strong mercaptan odor during the milling and the finished sheet also smelled of mercaptan.

Slabs were made by molding pieces of the sheet in a form under pressure at 350° F. and kept at this temperature for one hour. The slabs so obtained were odorless only when the peroxide was used. Heat stability of the composition was not impaired by the use of sodium perborate.

Example 2

The procedure was the same as in Example 1, but instead of sodium perborate 0.25 pt. potassium persulfate was used. In this case, too, the odor during processing and in the finished product was non-existent.

Example 3

100 parts Vinylite VYNW (96% vinyl chloride and 4% vinyl acetate copolymer) were treated as in Example 1 with 50 pts. dioctyl phthalate, 0.75 polyethylene and 3 pts. dibutyltin bisdodecylmercaptide and 0.1 pt. dicumyl peroxide. An odorless product was obtained and no odor was observed during processing.

Example 4

The procedure of Example 3 was repeated, using this time 0.1 pt. benzoyl peroxide. The results were equally satisfactory.

By the expression a "peroxide" a compound is understood having the group —O—O—.

What is claimed is:

1. A method of preventing odor-formation in the stabilization of polyvinyl chloride resins with organotin mercapto compounds, which comprises adding to the resin in processing sodium perborate in an amount ranging from 0.1 to 0.5% by weight of the resin.

2. A method of preventing odor-formation in the stabilization of polyvinyl chloride resins with organotin mercapto compounds, which comprises adding to the resin in processing potassium persulfate in an amount ranging from 0.1 to 0.5% by weight of the resin.

3. A method of preventing odor-formation in the stabilization of polyvinyl chloride resins with organotin mercapto compounds, which comprises adding to the resin in processing dicumyl-peroxide in an amount ranging from 0.05–0.25 by weight of the resin.

4. A method of preventing odor-formation in the stabilization of polyvinyl chloride resins with organotin mercapto compounds, which comprises adding to the resin in processing benzoyl peroxide in an amount of 0.05–0.25 by weight of the resin.

5. A composition of matter containing a polyvinyl chloride resin stabilized with an organotin mercapto compound and as an addition a peroxide in an amount of 0.05–0.5% by weight of the resin.

References Cited in the file of this patent

UNITED STATES PATENTS

| | | |
|---|---|---|
| 2,507,142 | Chaban | May 9, 1950 |
| 2,832,750 | Weinberg et al. | Apr. 29, 1958 |
| 2,904,569 | Ramsden | Sept. 15, 1959 |

FOREIGN PATENTS

| | | |
|---|---|---|
| 781,452 | Great Britain | Aug. 21, 1957 |